United States Patent
Slafer

(10) Patent No.: US 10,759,095 B2
(45) Date of Patent: Sep. 1, 2020

(54) FLUID APPLICATION METHOD FOR IMPROVED ROLL-TO-ROLL PATTERN FORMATION

(71) Applicant: MICROCONTINUUM, INC., Cambridge, MA (US)

(72) Inventor: W. Dennis Slafer, Arlington, MA (US)

(73) Assignee: MicroContinuum, Inc., Watertown, MA (US)

( * ) Notice: Subject to any disclaimer, the term of this patent is extended or adjusted under 35 U.S.C. 154(b) by 275 days.

(21) Appl. No.: 15/670,350

(22) Filed: Aug. 7, 2017

(65) Prior Publication Data
US 2017/0334100 A1 Nov. 23, 2017

Related U.S. Application Data

(63) Continuation of application No. 14/094,516, filed on Dec. 2, 2013, now Pat. No. 9,724,849.

(60) Provisional application No. 61/731,778, filed on Nov. 30, 2012.

(51) Int. Cl.
  *B29C 35/08* (2006.01)
  *B29C 35/10* (2006.01)
  *B29C 59/04* (2006.01)

(52) U.S. Cl.
  CPC .......... *B29C 35/0888* (2013.01); *B29C 35/10* (2013.01); *B29C 59/046* (2013.01)

(58) Field of Classification Search
  CPC .... B29C 35/0888; B29C 35/10; B29C 59/046
  See application file for complete search history.

(56) References Cited

U.S. PATENT DOCUMENTS

2006/0283539 A1\* 12/2006 Slafer ...................... B05D 1/28
156/230

\* cited by examiner

*Primary Examiner* — Joseph S Del Sole
*Assistant Examiner* — John Robitaille
(74) *Attorney, Agent, or Firm* — Cesari and McKenna, LLP

(57) ABSTRACT

Methods, apparatus and systems are disclosed by which patterned layers can be formed in a roll-to-roll process using a variable and programmable means for applying liquids and solutions used in the patterning process.

17 Claims, 9 Drawing Sheets

FLUID APPLICATION METHOD FOR IMPROVED ROLL-TO-ROLL PATTERN FORMATION

RELATED APPLICATION

This application is a continuation of U.S. application Ser. No. 14/094,516 filed Dec. 2, 2013, which claims the benefit of and priority to U.S. Provisional Application No. 61/731,778 filed 30 Nov. 2012, the entire content of which is incorporated by reference herein.

BACKGROUND

Typical well-known methods for forming micro- or nanoscale relief patterns by a roll-to-roll process generally involve the use of a rotary master pattern tool ("template"), usually in the form of a roll or belt, which contains the relief pattern to be replicated. The substrate having a replicated pattern can itself be the desired result, such as an optical pattern (diffractive optical elements, microlens arrays, optical security features, etc.) or a pre-formed surface upon which additional layers are formed (optical data storage preformat, embossed metallized hologram, micropixel array, microfluidic channels, etc.). Another application of relief patterns is in the formation of lithographic masks or stencils used to form patterned metallic or dielectric layers, such as for electronic circuits and the like.

In general, such relief patterns can be formed by any of several basic methods of molding, such as heat, pressure, chemical, and radiation curing, which can either be used alone or in various combinations. For roll-to-roll patterning, a deformable layer, typically in the form of a polymeric substrate, a multilayer substrate (coated or co-extruded layers on a carrier substrate) or a curable liquid layer, is continuously fed into a replication area of the roll processing machine. In the case of "dry" substrates, the application of heat and/or pressure causes the top surface or top layer(s) of the incoming film to soften and comply to the pattern of the patterning tool. Re-solidification, such as by cooling, etc., while in contact with the tool "sets" the pattern prior to separation of substrate and tool. For "liquid" processes, a fluid in the form of curable polymer or a liquid chemical is applied to the incoming substrate or patterning tool prior to contact between substrate and patterning tool. For radiation curable liquids, radiation of a suitable wavelength (typically generated by UV, visible, or electron beam sources, etc.) is applied while the liquid, substrate and tool are in simultaneous contact, and after solidification of the liquid the film is separated from the tool, its surface now being a replica of the tool pattern.

Other forms of pattern replication that do not utilize a molding process, such as photolithography, can also be carried out by roll-to-roll means. In this case, a photosensitive layer is applied to a carrier substrate and is exposed by radiation of an appropriate wavelength through a photomask containing transparent and opaque areas. The photosensitive layer is selectively exposed to the radiation passing through the transparent areas only, and a subsequent development or removal step is required to form the desired relief pattern. The exposure step can be carried out by projecting the exposing photomask image onto the photosensitive layer or by contact of the mask to the photosensitive layer during exposure. In the photomask process, diffractive effects can result in the exposed pattern being broadened or otherwise different from the pattern of the photomask, thus pattern resolution is a function of the pattern size and exposure wavelength.

Other methods for forming material patterns (i.e., patterns comprised of discontinuous areas of metals and/or dielectrics on a substrate) include coating or otherwise applying one or more material layers over a mask or stencil (additive process) or removal of one or more material layers through a mask or stencil (subtractive process). The additive step is typically carried out by blanket coating of the entire surface (such as by vacuum deposition) and the subtractive by immersion of entire substrate (wet etching), where the actual pattern is defined by the removal of the relief mask or stencil.

Many methods have been developed for applying liquid layers to substrates in roll-to-roll processes, including gravure/flexographic printing, reverse roll coating, drip coating, slot (die)-coating, wire-wound rod applicator, pressure nip, lamination, ink-jet as well as other techniques. The liquids may be in the form of aqueous or solvent solutions, radiation-curable monomers (e-beam, UV, etc.), or chemicals that interact with the substrate or coating. Many of these application techniques have been developed by the graphic arts industry for applying inks and varnishes to substrates. However, although these techniques are adequate for general roll coating and printing, they all suffer from limitations in resolution, feature acuity, and ability to modify liquid deposition characteristics and locations "on the fly", all of which are important in pattern replication.

Furthermore, most conventional liquid application processes used in pattern replication are not capable of forming the ultra-thin layers required for certain applications. One common method used to blanket coat thin film layers is to add a solvent or diluent to the fluid such that after application of the coating solution, removal of the diluent produces a thinner layer than the originally applied "wet" layer (in proportion to the solid/diluent ratio). However, this has several drawbacks: it requires a means to remove the diluent, e.g., a drying oven of suitable length, it is susceptible to particulate contamination, and it can be difficult to maintain precise coverage uniformity. The drying process, which typically uses hot air or inert gas, exposes the layer to the possibility of particulate contamination as well as layer disturbance due to air impingement and turbulence. Due to variations in wetting, surface flatness, etc., spreading and uniformity of the coated layer cannot be controlled to the degree required for replication of very high resolution patterns.

The precise control of thickness uniformity and spatial distribution of the applied liquids is particularly crucial for roll-to-roll patterning. In some cases, for example where nanoscale features are to be formed, it is very important that the fluid be applied with a very high degree of thickness uniformity and special precision, and in a manner that minimizes particulate contamination. Forming nanoscale features often requires extremely thin layers, and optimum pattern replication may also require modulating the coating thickness, viscosity or other physical or material parameters. These capabilities are not available with the current art.

Another area requiring high replication fidelity and pattern uniformity is the formation of relief masks for subtractive or additive processes, the formation of which typically produces a certain amount of polymer residual ("scum") at the bottom of the formed features, whether by molding or conventional lithography. Because the residue layer covers the layer under the mask and blocks exposure to the desired effects of additive or subtractive processing, it must be removed ("de-scummed") before further processing. This is typically done by plasma ("dry") etching. However, thickness variations of the residue layer can cause serious problems for precise mask definition using such molded masks: if the residue thickness varies in different areas of the pattern, then the plasma etch process will result in insufficient residue removal in some areas (where residue is too thick) and excessive removal in others (where the residue is too thin). Insufficient etching will not clear (or not fully clear) the residue from the bottom of the mask, resulting in connected (or larger) features in subtractive processes, or missing (or smaller) features in additive processes. Over-etching will remove too much material and make the features too small (subtractive processing) or too large (additive processing). Such pattern variations are unacceptable for precision and/or nanoscale applications.

In addition to lack of thickness or spatial uniformity of the applied polymer or fluid layer, another source of poor residue uniformity is the change in effective volume of the cavities of the patterning tool formed between the tool and the substrate. This results from hydrodynamic and other forces that can distort the substrate (and possibly the tool) when they are brought together under pressure and can result in areas in which the thickness of the mask itself varies, particularly in large areas that have no pattern or relatively large feature sizes. For example, if the mask to be formed is to cover a large unpatterned area (for example, many times the mask feature width), the separation distance between the tool and the substrate may be reduced in the center of this area, since substrate flexibility and the polymer fluid dynamics of the polymer can cause the two surfaces to pull together or spread apart, reducing or increasing, respectively, the thickness of the intervening polymer layer and the resulting mask feature height. During plasma removal of the residue layer, abnormally thin sections of the mask may be etched away, resulting in defects in the formed pattern. These problems are exacerbated with the thin polymer substrates typically used in roll-to-roll manufacturing.

There is a need for methods and systems by which the above shortcomings and limitations of the current coating and patterning art can be remedied.

SUMMARY

Embodiments of the subject technology described herein can provide methods and/or apparatus that are operative to remedy the limitations of the prior art for roll-to-roll formation of patterned material layers and in particular in the formation of molded masks. Methods/apparatus according to the present disclosure may utilize arrays of individually controlled applicators to apply one or more distinct fluids to a substrate (or tool) in a roll-to-roll pattern forming machine in a spatially-, chemically- and/or temporally-selective manner. This fluid deposition control represents a significant improvement over prior art by improving the capability to form more accurate patterned layers while also providing improved cost-effectiveness by supplying correct amounts of specific fluids when and where needed.

The array of fluid dispensers can be digitally controlled by computer or other electronic control system and comprises a multiplicity of devices such as ink jet nozzles or fluid injectors, or a combination of multiple types of applicators. In one embodiment, one or more rows of dispensing orifices (nozzles) spans the substrate or rotary tool transversely and applies fluid to the substrate as it enters the molding station (FIGS. 1 & 10). Alternatively, the dispenser array can be positioned to apply fluid to the rotary patterning tool itself (FIG. 9). Each nozzle (or grouping of nozzles) is controlled individually and is capable of applying a single dot or a stream of dots of fluid. The dot spacing density (center-to-center distance of the individual dots) in the cross-web (transverse) direction is controlled by the linear nozzle density (FIG. 1), but can be further increased if necessary by moving or rotating the line of nozzles relative to the direction of web movement (FIG. 2). Additional rows of nozzles can be added and positioned to "interleave" the dot pattern for higher density (FIG. 3), where these can also be positioned for higher dot density. The dot spacing in the web direction can be controlled by a combination of web speed and nozzle firing frequency/duration. Another variable is dot volume, which uses nozzles capable of delivering variable dot sizes to allow an additional degree of fluid control.

One important embodiment of the present disclosure is the ability to position the fluid in relation to the pattern itself, such that, for example, fluid is applied only where needed and excluded where not needed (FIG. 5). This not only eliminates waste, but also assures correct spatial placement of fluid in the patterning tool. Most importantly, for relief mask formation, this eliminates placement of fluid (e.g., imprinting monomer) from areas that do not require a mask layer and results in shorter plasma etch cycles for residue removal, as the plasma etch step can often be one of the most expensive and low throughput of the process steps used in mask formation. By reducing the amount of material to be etched, gaseous byproducts and power consumption are also reduced.

The selective deposition of materials spatially and temporally requires that the deposition be synchronized with the pattern, which can be done by electro-optical or electro-mechanical sensing of the pattern, including a time offset to assure that the fluid will contact the pattern in the correct location (FIG. 6). For example, in order to replicate only certain areas of a pattern using a radiation curable monomer, the monomer must be either applied directly to the desired portions of the imprinting drum or applied to the incoming substrate such that the location of the applied fluid pattern coincides with the desired portions of the imprinting drum when they come together. Triggering can be accomplished based on drum position or by fiducial or alignment mark or by design embedded in the pattern (such as a crosshair or moiré pattern, etc.), as is known to the art. In another method, this can be done by storing the image of the complete drum pattern in the print computer memory and triggering the start of the print cycle using a time or position offset to assure that proper synchronization is accomplished. In yet another method, a vision system can be used to generate an appropriate print pattern based on a detected drum pattern and used to print the corresponding pattern with the appropriate offset to allow proper synchronization. Image processing software can be used to modify the deposited fluid (essentially, an "image") as required, for example by printing the negative or positive version of the drum pattern, etc. (depending on whether additive or subtractive processing is to be subsequently carried out, for example).

Most rotary imprinting tools have one or more seams where various individual stamps or shims are joined together to form a continuous or semi-continuously patterned drum or belt tool, and it is sometimes undesirable to replicate this part of the pattern, such as where there are large discontinuities or shapes that might cause the replicated part to strongly adhere in this area and thus not release properly during separation of the tool and substrate. This can cause surface irregularities or even web breaks. By controlling the application of the fluid used in the replicating process so that no fluid is applied to areas corresponding to these seams, this problem is avoided. The selective application of fluid by the means of this disclosure allows the exclusion of areas that are designed to have no pattern ("blank" areas of drum) or areas not to be replicated onto the substrate.

Another embodiment of this disclosure provides a means to form continuously varying patterns from a fixed pattern drum using the ability of the fluid applicator to print variable patterns. Rather than applying fluid in a specific pattern that is related to the pattern of the drum, as in the previous embodiment, or over the whole surface of the drum to replicate the complete drum pattern, in this case the applied fluid pattern is generated by a computer algorithm or from a stored image or file that is not necessarily correlated to the drum pattern (FIG. 7). In one example, the drum pattern may contain a diffractive, holographic, or security-type pattern, etc., and the applied fluid pattern as generated by the computer results in only those drum areas being replicated where fluid is applied. This results in the computer-generated printed "image" having the diffractive (or holographic or other) structure of that section of the drum, allowing, for example, serial or personalized information, including data and images, to be encoded with such security or optical features.

It is another feature of the present disclosure to apply selective amounts of fluid to selective areas of the tool pattern, such that areas that require very little fluid and other areas that require a larger amount of fluid can both be satisfied simultaneously by the controlled dispensing of the fluids.

It is another aspect of the present disclosure that different fluids having different chemical and/or physical properties can be spatially distributed according to the relief pattern to be formed (FIGS. 4 and 8). Such properties can include viscosity, composition, wetting (adhesion) characteristics and plasma etch rate, among others. For example, it is known that for imprinting very smaller features (tool cavities), lower viscosity fluids are desirable in that they are better able to access these small spaces and to minimize air trapping, whereas for much larger cavities or areas with few features, a higher viscosity fluid is less likely to be squeezed out of such spaces compared to a low viscosity fluid during lamination to the imprint tool, as happens when a flexible film is used as the substrate. Thus a lower viscosity monomer would optimally be used in some areas and a higher viscosity one in other areas of the same pattern, depending on the feature volumes. In this case, multiple nozzle arrays can each have different viscosity fluids and can dispense the appropriate material, with proper synchronization, the corresponding pattern areas. Thus better replication of the pattern is achieved, and in particular polymer masks can be formed that more accurately replicate the desired mask pattern. Ink jet and other dispenser heads, can be heated to temporarily decrease the fluid viscosity for the purposes of dispensing, and once ejected, the fluids quickly return to their original viscosity (upon temperature equilibration). Similarly, solvents can be added to temporarily lower viscosity for optimal dispensing, followed by solvent removal by evaporation to return the fluid to its previous viscosity.

Similar dispensing of fluids with different characteristics from separate nozzle arrays can be used to selectively apply fluids spatially, such as materials with different plasma etch rates for selective polymer removal of one material relative to another, different adhesion properties for selective liftoff, etc.

In another embodiment of this disclosure, a roll of previously masked substrate can be processed in a selective manner, by either applying etchant solutions selectively to remove material through the mask, where higher concentrations can be applied where more material may need to be removed than others, or different etchants can be applied in different areas (one type for metals, another type for dielectrics, etc.). For additive processing, different "inks" or electroless plating solutions (seed & nucleation, deposition layers) can be applied to selective mask areas. Both subtractive (etchant) and additive (inks or coatings) can be done simultaneously, using different applicator heads in tandem.

It is an embodiment of the current disclosure that any of radiation-curable monomers, thermal moldable monomers, chemically-reacting materials, embossing solvents, or any combination hereof, can be applied in a selective and programmable manner for patterning by the methods described herein.

It is yet another embodiment of the present disclosure that the selective deposition of photoresists and/or photo-curable resins can be used in combination with contact or projection photomasks to form mask patterns, either by roll-to-roll or flat-bed processes. Here the photoactive fluid is applied only in those areas that will be illuminated in order to cause curing or cross-linking of the exposed material. During development, where the unexposed material is removed, much less material will need to be removed, as determined by the resolution of the application process. For positive-working photoresists, where light exposure causes material to be removed in the subsequent development step, spatial application that minimizes coating in such areas will have the same advantages. This reduces the use of photoactive materials and resist stripping materials, reduces waste by-products, and shortens the processing time to enable higher throughput processing.

While aspects of the present disclosure are described herein in connection with certain embodiments, it should be noted that variations can be made by one with skill in the applicable arts within the spirit of the present disclosure.

DETAILED DESCRIPTION

As used herein, the term "substrate" is used to denote a support film that carries the replicated pattern, in some cases as formed directly into the surface of the film itself or as an applied layer over the substrate. In roll-to-roll manufacturing terminology, the substrate is also referred to in the art as a "web", "base", or "foil" (the last term often encompassing flexible metal substrates as well). The process of replicating a pattern is variously referred to as stamping, molding, embossing, imprinting, forming, where the prefixes "micro-" and "nano-" are often added to denote a general size range of the replicated features. The term "nanoimprint lithography" has more recently been used to describe the replication of nanoscale features. In continuous roll-to-roll replication, the element that forms the pattern replica is variously described as a rotary stamp or tool, embossing drum, imprinting cylinder, printing sleeve, belt, etc.

Figure 1:
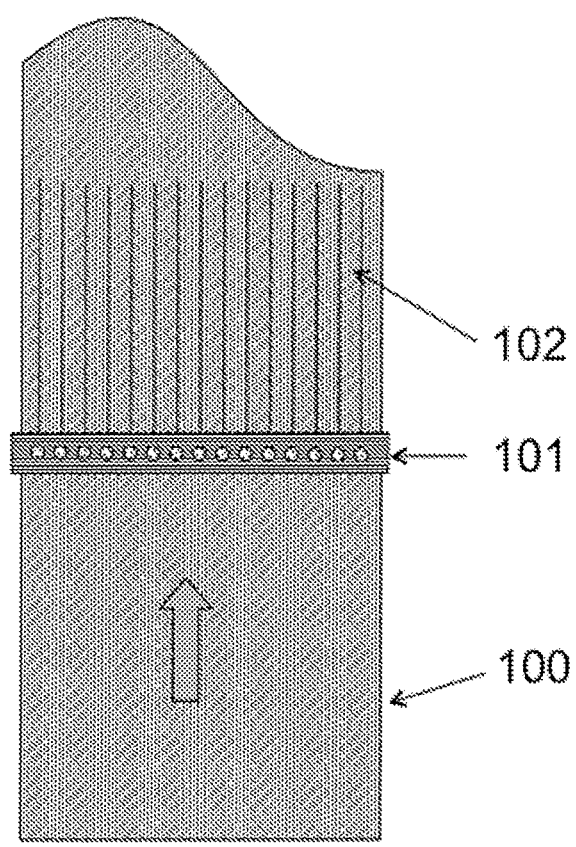
FIG. 1 depicts multiple-nozzle fluid application to moving web.

FIG. 1 illustrates a normal incidence view of a flexible substrate prior to coming into contact with the rotary patterning template (not shown). Substrate 100 travels under dispenser array 101, after which dispensed fluid 102 can be seen deposited onto the substrate. The electronic controls for the dispense is not shown. Illustrated here is a uniform application of fluid from each dispenser orifice at low linear nozzle density, but current technology allows tens to hundreds of nozzles per linear inch to be utilized.

Figure 2:
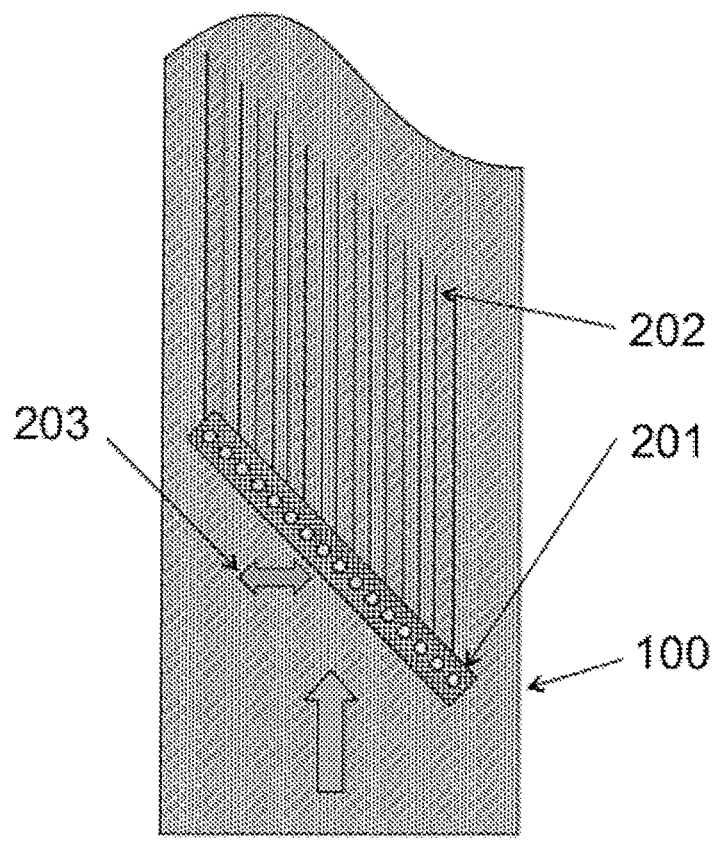
FIG. 2 depicts multiple-nozzle fluid application to moving web with array rotation for higher resolution.

In FIG. 2 is illustrated the ability to achieve higher density with a dispenser array. In this case the same dispenser shown in FIG. 1 (101) is rotated around its normal axis (201) such that the nozzles are closer together, resulting in the output 202 to have higher spatial density. Vibrating the array in the cross-web direction 203 can also be used to increase the spacing density. It should be noted that although a linear array of dispenser nozzles is shown for simplicity, a "2D" array can also be used for even greater density.

Figure 3:
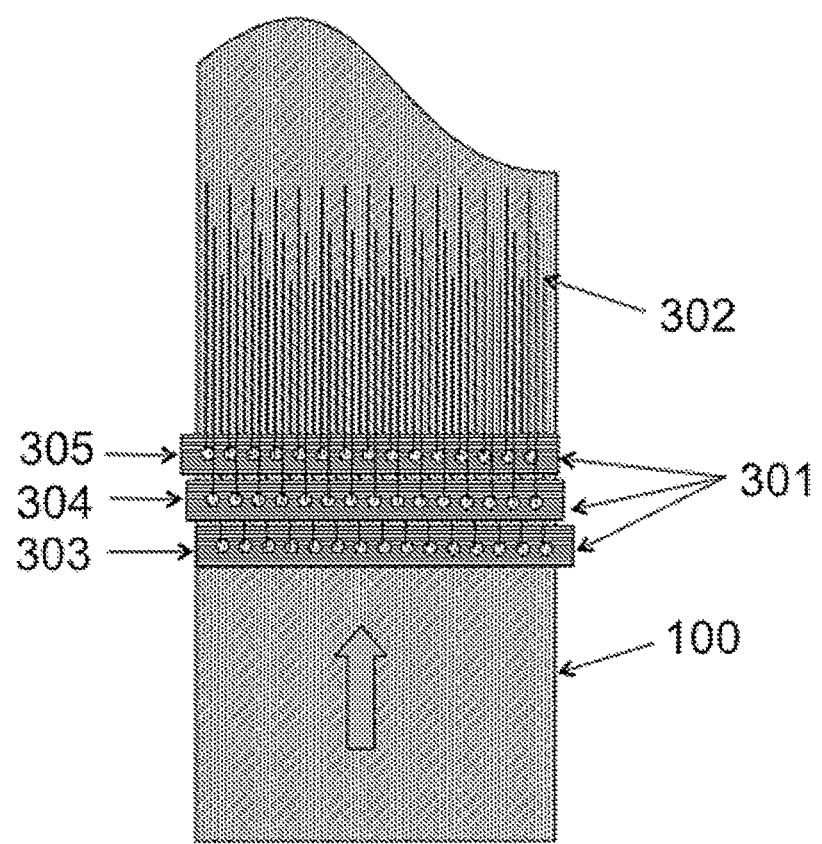
FIG. 3 depicts multiple-nozzle fluid application onto moving web using multiple arrays.

Shown in FIG. 3 is a fluid application configuration using multiple linear dispensers. Here substrate 100 is fed under head array 301, consisting of individual head arrays 303, 304, 305. The output from all heads is shown as 302. Note that each of 303, 304, 305 can be individually rotated (not shown) for different linear densities (they can be space apart in the web travel direction to accommodate this rotation). Note dispense flow is simplified to more clearly show the fluid path from each nozzle.

Figure 4:
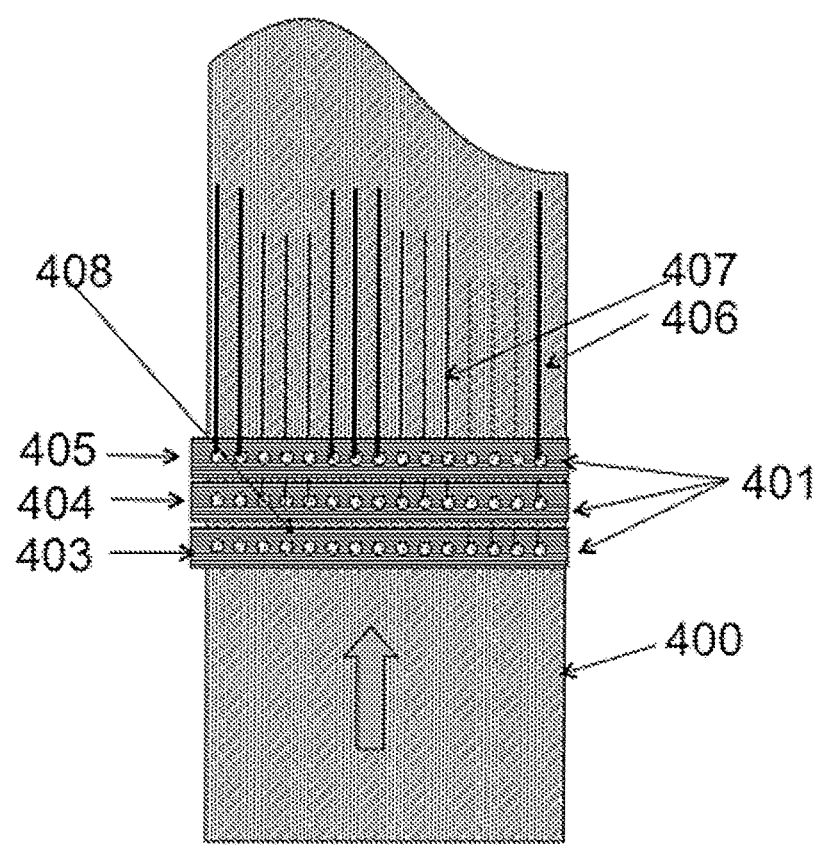
FIG. 4 depicts multiple-nozzle arrays with different fluids.

The use of different fluids being dispensed from different heads is illustrated in FIG. 4, where the input substrate 100 is fed under dispensers 401, with individual arrays 403, 404, 405 allowing various possible printing configurations. For example, multiple nozzles at the same cross-web position can be fired together to give higher fluid coverage (406). Other nozzles can be fired to dispense only a certain fluid in a certain area (407), or even no fluid (408). In this sketch, heavier line weights are used to denote different physical fluid properties, such as viscosity or surface tension.

Figure 5:
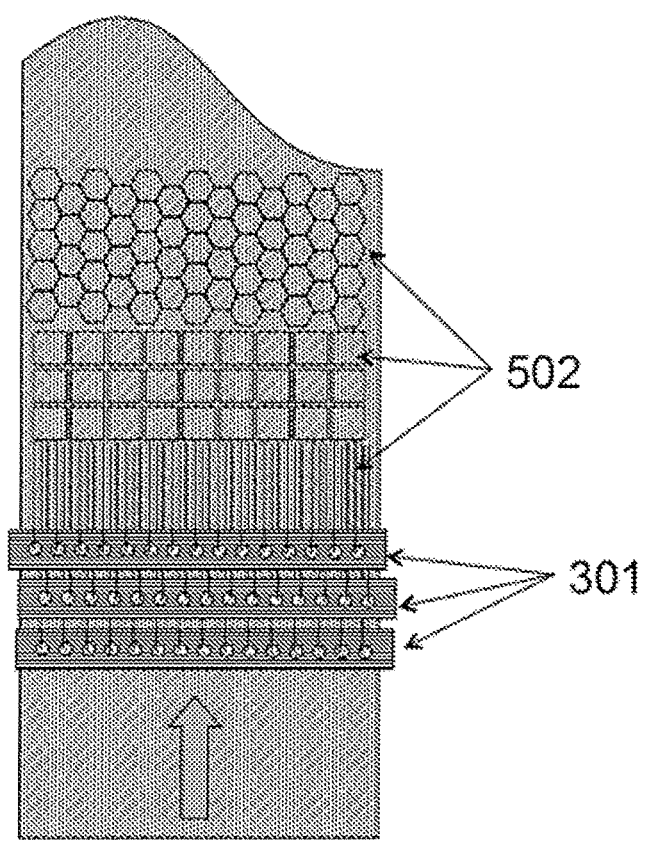
FIG. 5 depicts synchronized patterning of substrate using multiple-nozzle array.

The use of image-wise fluid dispensing is illustrated in FIG. 5. Here, head array 301 is used to print a specific pattern 502 comprising various pattern elements (lines, squares, hexagons, etc.). In this case the dispensed pattern corresponds to the template pattern on the rotary tool and is designed to apply the pattern replication fluid only where required.

Figure 6:
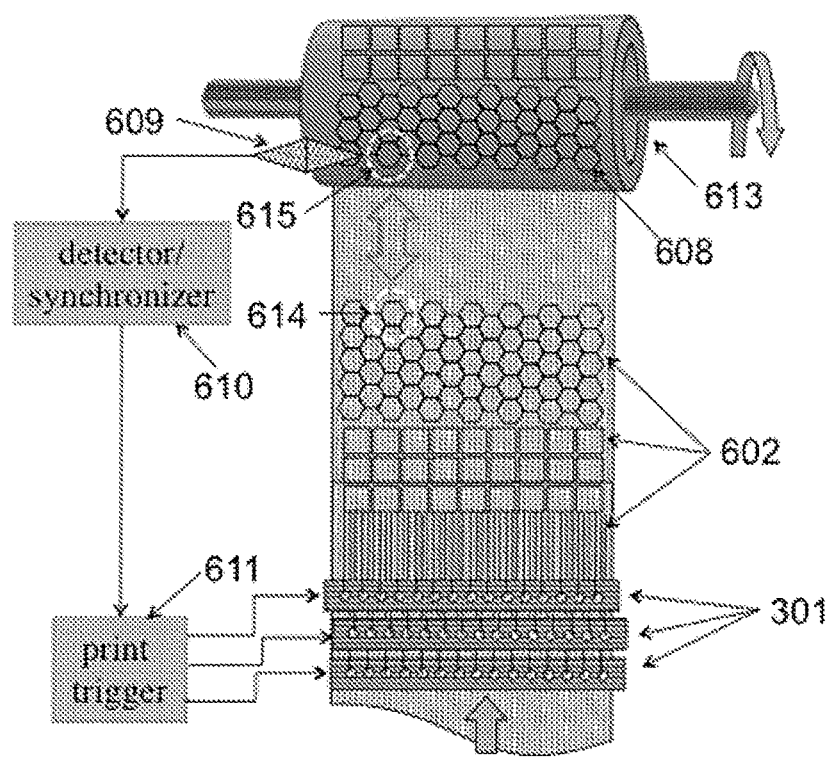
FIG. 6 depicts synchronized patterning of substrate using multiple-nozzle arrays and multiple fluids.

Synchronizing the image-wise fluid output to the pattern of the drum template is shown schematically in FIG. 6. Fluid pattern 602 corresponds to template pattern 608 on rotary drum 613. In order to assure that both patterns align (i.e., fluid pattern 614 with template pattern 615), an opto-electric sensor 609 is used to determine the position of a particular template pattern element (or alignment mark) and fire the dispenser pattern at the correct time such that the fluid pattern will align with the template pattern when it arrives at the template 608 on the drum 613. The detection electronics 610 drives the print trigger 611 at the appropriate time for the patterns to be synchronized.

Figure 7:
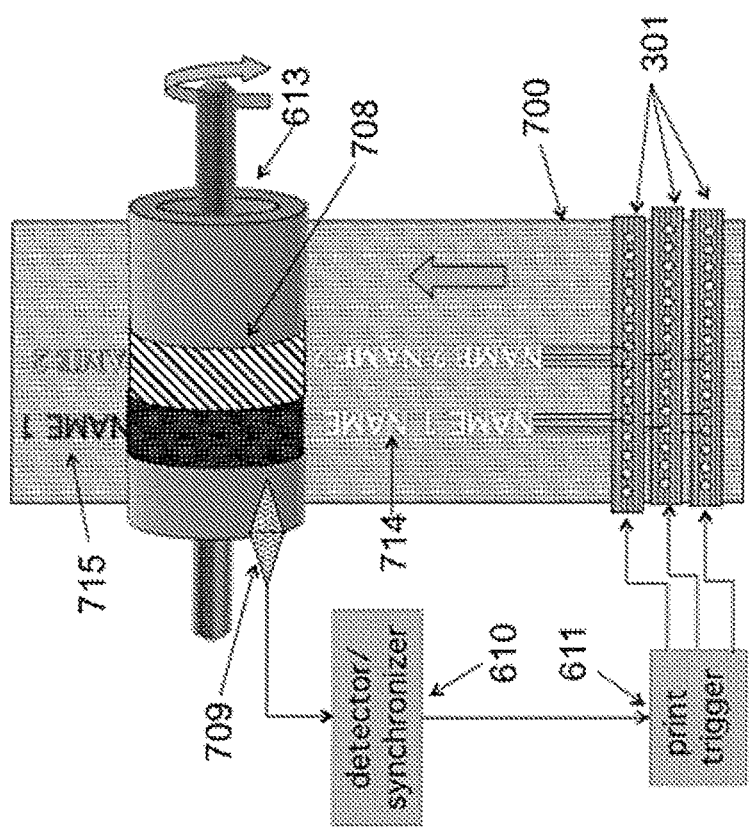
FIG. 7 shows a method for encoding patterns into variable data.

FIG. 7 illustrates a variation of that illustrated in FIG. 6. Here the template pattern 708 is mounted on rotary drum 613 and consists of an optical element, such as security hologram or optical variable device (OVD). Head array 301 dispenses a radiation curable monomer fluid onto substrate 100 in a specific pattern 714. Exposure of the fluid while in contact with the template pattern (not shown) results in the cured polymer 715 containing the template pattern. When necessary to synchronize the printed fluid with the pattern, sensor 709 sends the position signal the processing unit 610, which in turn triggers the fluid applicator 611.

Figure 8:
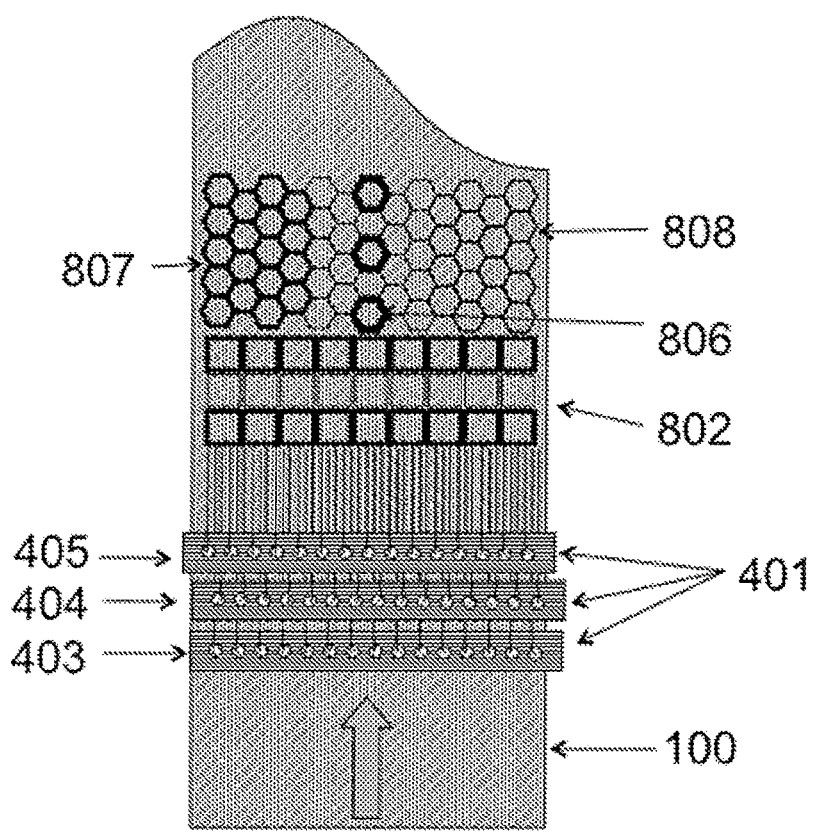
FIG. 8 depicts the synchronized patterning of substrate using multiple-nozzle arrays and multiple fluids.

FIG. 8 illustrates the use of different fluids to optimize the fidelity of the replicated pattern. An array of dispensing nozzles 401 produces on substrate 100 a fluid pattern 802 consisting of fluid 806, 807, 808, each having different physical or chemical characteristics (e.g., viscosity) and each being dispensed by a different array (403, 404, 405). Each fluid element is optimized for its corresponding pattern element. For example, 806 might be a higher viscosity radiation curable monomer for a large-volume template element, whereas 808 might be a lower viscosity monomer required for very small pattern elements. As with the process shown in FIG. 6, the variable-material pattern is synchronized with the rotary template pattern.

Figure 9:
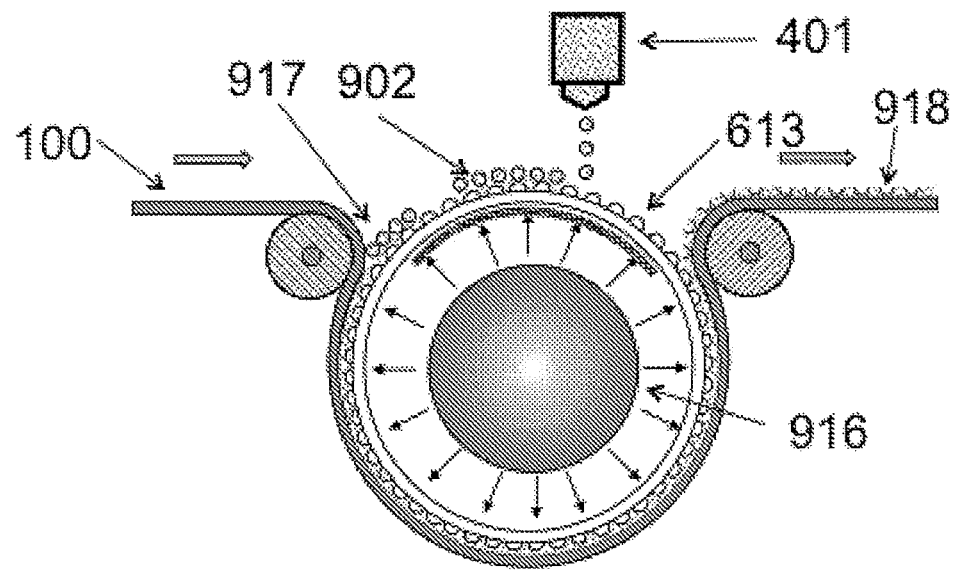
FIG. 9 is a schematic depiction of the selective application of fluid to patterning drum.

A side view sketch of a roll-to-roll process of the present invention, where the fluid is dispensed directly onto the template instead of the substrate, is given in FIG. 9. Substrate 100 is transported into nip 917, where it comes into contact with fluid 902, in this case a radiation curable monomer, which was applied using array dispenser 401 onto the rotary template 613. Internal radiation source 916 causes solidification of the applied monomer, and the formed pattern is continuously removed as the substrate with patterned layer 918 is transported to the rewind station (web transport, control, and synchronization are not shown). Note that for internal radiation curing, drum template 916 must be transparent to the radiation required for solidification of the monomer fluid. The rotary template 613 can also be a rotary "metal-on-glass" photomask, where in this case the openings in the mask allow radiation to pass and expose the monomer (photoresist) fluid applied by the dispenser. For small features, the photomask process generally does not achieve the small feature sizes that the molding process can achieve due to light scattering, diffraction and other optical issues.

Figure 10:
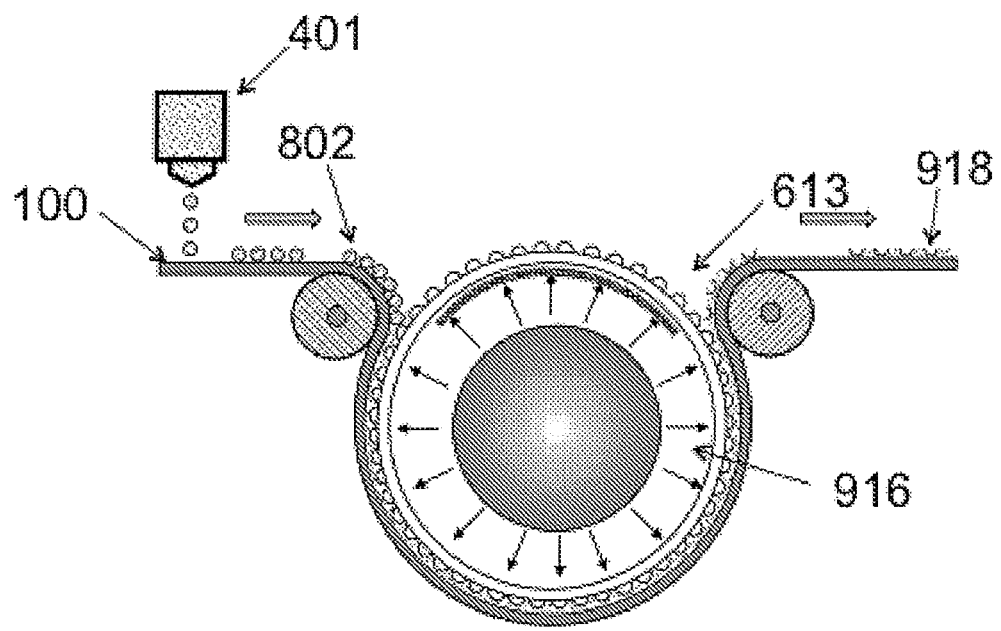
FIG. 10 is a schematic depiction of the selective application of fluid to substrate.

The process in FIG. 10 is similar to that in FIG. 9, except in this case fluid 802 is applied to incoming substrate 100 rather that to the template pattern 613, and exposure source 916 causes fluid 802 to solidify, after which time it is separated from the rotary template 613 as patterned substrate 918.

Having described the invention, what is claimed as new is:

1. A continuous roll-to-roll method for forming a desired pattern on a flexible substrate of desired length, the method comprising:
   a. providing a rotary-shaped template surface comprising a 3D relief pattern in a roll-to-roll embossing process;
   b. providing a substrate having a surface for receiving a complementary relief pattern complementary to that of the 3D relief pattern;
   c. providing a fluid applicator operative to apply a fluid selectively in relationship to the 3D relief pattern of the template;

d. contacting together the substrate and the rotary-shaped template with the intervening selectively applied fluid;

e. solidifying the fluid wherein the complementary relief pattern is formed; and f. by use of a continuous roll-to-roll process, removing the substrate containing the complementary relief pattern from the rotary template surface;

wherein the fluid is a polymer-softening solvent or an etchant.

2. The method of claim 1 in which the fluid is a radiation-curable monomer.

3. A continuous roll-to-roll method for forming a desired pattern on a flexible substrate of desired length, the method comprising:

a. providing a rotary-shaped template surface comprising a 3D relief pattern in a roll-to-roll embossing process;

b. providing a substrate having a surface for receiving a complementary relief pattern complementary to that of the 3D relief pattern;

c. providing a fluid applicator operative to apply a fluid selectively in relationship to the 3D relief pattern of the template;

d. contacting together the substrate and the rotary-shaped template with the intervening selectively applied fluid;

e. solidifying the fluid, wherein the complementary relief pattern is formed; and f. by use of a continuous roll-to-roll process, removing the substrate containing the complementary relief pattern from the rotary template surface;

wherein the fluid applicator comprises multiple rows of applicator arrays, and wherein rows of applicator arrays dispense different fluids.

4. The method of claim 3 in which the fluid applicator comprises an ink jet head array.

5. The method of claim 3 in which the fluids differ in physico-chemical properties.

6. The method of claim 5 in which the differing property is viscosity.

7. The method of claim 3 in which the fluids are different solvents.

8. The method of claim 1 in which the dispensers are controlled by computer.

9. The method of claim 8 in which the fluid is dispensed in a pre-defined pattern.

10. The method of claim 9 in which the pattern is a specific relationship to the template pattern.

11. The method of claim 8 in which electronic and/or optical means are used to synchronize the fluid application.

12. The method of claim 4 in which the ink jet nozzles can dispense variable fluid volumes.

13. The method of claim 9 in which deposition at template seams or defects is avoided.

14. A continuous roll-to-roll method for forming a desired pattern on a flexible substrate of desired length, the method comprising:

a. providing a rotary-shaped template surface comprising a 3D relief pattern in a roll-to-roll embossing process;

b. providing a substrate having a surface for receiving a complementary relief pattern complementary to that of the 3D relief pattern;

c. providing a fluid applicator operative to apply a fluid selectively in relationship to the 3D relief pattern of the template;

d. contacting together the substrate and the rotary-shaped template with the intervening selectively applied fluid;

e. solidifying the fluid, wherein the complementary relief pattern is formed; and f. by use of a continuous roll-to-roll process, removing the substrate containing the complementary relief pattern from the rotary template surface;

wherein the 3D relief pattern of the rotary template is formed by an opaque metal layer on a transparent cylindrical substrate in the form of a rotary photomask.

15. The method of claim 14 in which radiation exposure through the rotary photomask is used to solidify the applied fluid.

16. The method of claim 15 in which the fluid is a radiation-curable monomer.

17. The method of claim 1 in which the fluid is applied to the substrate.

\* \* \* \* \*